US005537475A

United States Patent [19]

Micali

[11] Patent Number: 5,537,475

[45] Date of Patent: Jul. 16, 1996

[54] EFFICIENT DIGITAL SIGNATURE ALGORITHM AND USE THEREOF TECHNICAL FIELD

[76] Inventor: Silvio Micali, 459 Chestnut Hill Ave., Brookline, Mass. 02146

[21] Appl. No.: 189,977

[22] Filed: Feb. 1, 1994

[51] Int. Cl.$^6$ .................................................. H04N 9/30

[52] U.S. Cl. ................................ 380/30; 380/23; 380/25

[58] Field of Search ................................ 380/23, 25, 30, 380/28

[56] References Cited

U.S. PATENT DOCUMENTS 4,625,076 11/1986 Okamoto et al. ......................... 380/30
5,276,737 1/1994 Micali ...................................... 380/30

OTHER PUBLICATIONS

"Contemporary Cryptology"Edition by G. Simmons, 1992, pp. 348–350, Techniques for Digital Signatures.

Königs, H.–P.: "Cryptographic Identification Methods for Smart Cards in the Process of Standardization", IEEE Communications Magazine, vol. 29, No. 6 (Jun. 1991), pp. 42–48.

Rivest, et al., "A Method for Obtaining Digital Signatures and Public–Key Cryptosystems, " Comm. ACM, vol. 21, pp. 120–126 (Feb. 1978).

Rabin, "Digitized Signatures as Intractable as Factorization, " MIT Laboratory for Computer Science Technical Report MIT/LCS/TR–212, Massachusetts Institute of Technology, Cambridge, MA, pp. 1–26 (Jan. 1979).

Williams, "A Modification of RSA Public–Key Cryptosystem," IEEE Trans. Information Theory, vol. IT–26, pp. 726–729 (1980).

Goldwasser, et al., "A Digital Signature Secure Against Adaptive Chosen–Message Attacks", SIAM J. Comput., vol. 17, No. 2, pp. 281–308 (Apr. 1988).

Goldreich, "Two Remarks Concerning the Goldwasser–Micali–Rivest Signature Scheme", Proc. Crypto 86, pp. 1–9 (Sept. 1986).

Even, et al., "On–Line/Off–line Digital Signatures", Proc. Crypto 89, Springer Verlag, pp. 264–275 (1990).

Fiat, et al., "How to Prove Yourself Practical Solutions of Identification and Signature Problems", Proc. Crypto 86, Springer Verlag, pp. 186–194.

Micali, et al., "An Improvement of the Fiat–Shamir Identification and Signature Scheme", Proc. Crypto 88, pp. 244–247 (Mar. 1988). Springer–Verlag.

Ong, et al., "Fast Signature Generation with a Fiat–Shamir Like Scheme", Proceedings of Eurocrypt 90, pp. 432–440 (1991). Springer–Verlag.

Schnorr, C.–P. "Efficient Identification and Signatures for Smart Cards", Proc. Crypto 89, Springer Verlag, pp. 239–252 (1990).

National Institute of Standard and Technology, "A Digital Signature Standard as Described in Debating Encryption Standards," Comm. ACM, vol. 35, No. 7, pp. 33–54, (Jul. 1992).

(List continued on next page.)

*Primary Examiner*—Gilberto Barron, Jr.
*Attorney, Agent, or Firm*—David H. Judson

[57] ABSTRACT

A digital signature scheme wherein the signature of a message M relative to a public key is computed by means of a secret key. The scheme begins by having the user select a number x independent of M. This step may occur off-line and before there is any knowledge of the particular message M to be signed. To sign the message, the routine computes a description of a function G which is dependent of the message M, and then applies the function G to x to produce a string z. The routine outputs z and a description of a second function F as the desired signature of the message M. Thus according to the invention a signature of the message is obtained by applying to an independent argument x a function dependent on M. This operation provides enhanced efficiency and security over the prior art and facilitates use of the scheme to allow multiple users of a secure communications system to share the same public key; alternatively, the scheme is useful for generating short certificates of public keys used in such systems.

10 Claims, 1 Drawing Sheet

12 NUMBER X
MESSAGE M 14
COMPUTE 16
$\sigma$
SK
20
COMPUTE
$G_\sigma$
APPLY
Z
18 DIGITAL SIGNATURE

OTHER PUBLICATIONS

Merkle, R. "A Certified Digital Signature," Proc. Crypto 89, Springer Verlag, pp. 218–238 (1990).

Naor, et al., "Universal Hash Functions and Their Cryptographic Applications,"Proc. 21st Annual Symposium the Theory of Computing, ACM, pp. 33–43 (1989).

Shamir, A. "Identity–Based Cryptosystems and Signature Schemes,"Proc. Crypto 84 pp. 47–53 (1985). Springer–Velag.

Bellare, et al., "How to Sign Any Trapdoor Permutation," Journal of ACM, vol. 39, No. 1, pp. 214–233 (Jan., 1992).

Guillou, et al., "A Paradoxial Identity–Based Signature Scheme Resulting from Zero–Knowledge," Proceedings Crypto 88, pp. 216–231 (1988). Springer–Velag.

Elgamal, "A Public Key Cryptosystem and a Signature Scheme Based on Discrete Logarithms," IEEE Trans. on Information Theory, vol. IT–31, No. 4, pp. 469–472 (Jul., 1985).

EFFICIENT DIGITAL SIGNATURE ALGORITHM AND USE THEREOF TECHNICAL FIELD

TECHNICAL FIELD

The present invention relates generally to secure communications and more particularly to computationally-efficient yet highly-secure digital signature schemes.

BACKGROUND OF THE INVENTION

In recent years, there has been a dramatic increase in the need for systems that can protect digital data from potential eavesdroppers, forgers, and other adversaries. This is largely due to the fact that an unprecedented portion of all commercial transactions and communications are now handled with digital electronics. In addition, the sophistication of potential adversaries has increased, which has made the problem of protecting digital data even more pressing.

In response to this need, a wide variety of interesting and novel schemes have been developed for protecting and authenticating digital data. The problem now faced by many corporations and government bodies is to choose a scheme from among the many that will be both secure and economical. NIST, in particular, is faced with the task of selecting "standard" methods for encrypting and authenticating data.

Traditionally, written data has been authenticated by appending the handwritten signature of the appropriate individual to the data. Modern methods for authenticating digital data proceed in a similar fashion except that the handwritten signature is replaced with a digital signature. The digital signature consists of a stream of bits which is computed by the signer based on the message being signed. The digital signature should have the properties that anyone can verify that a signature is the valid signature of the signer for the associated message, and that only the signer is able to generate the signature.

An exemplary method for computing digital signatures today is the RSA scheme. In the RSA scheme, each individual is provided with a secret pair of large (e.g., 500-digit) prime numbers $P_1$ and $P_2$. The pair $(P_1,P_2)$ is referred to as the secret key for the individual. The corresponding public key for the individual is the pair (Q,r) where $Q=P_1P_2$ and r is a fixed positive integer that is relatively prime to $P_1-1$ and $P_2-1$. The signature for a message M is a number x for which $x^r=h(M) \bmod Q$. The function h is a publicly-available hash function that maps any data string M into a k-bit number where generally $k \leq \log Q$. The step of computing h(M) is known as pre-hashing. This initial step is common to all known digital signature algorithms because applying the signing procedure directly to M, rather than h(M), may be either impossible or impossibly time-consuming. The hash function h used for pre-hashing needs to be secure, i.e., easy to compute and behaving in practice like a random function (such a secure function H has two important properties: it is easy to compute h(M) given M but impossibly hard to compute M given h(M), i.e., h is "one-way", and it is impossibly hard to find two strings M and M' such that h(M)=h(M')).

Many similar schemes have also been proposed, including the well-known DSA algorithm. The practicality of schemes such as RSA and DSA is based on several factors: it is not overly difficult for an individual's computer to produce a signature x for a message M given that the computer knows the secret key $(P_1, P_2)$, the fact that it is relatively easy for someone else's computer to verify that x is a signature for M given knowledge of the public key (Q,r), the fact that the signature itself is relatively short (e.g., it consists of about 1000 bits), and the fact that the public key is also relatively short (e.g., it also consists of about 1000 bits).

For a digital signature algorithm to be secure, it must be practically impossible for an adversary to produce a signature for any message M without knowledge of the private key, even if the adversary is aware of the public key and can obtain valid signatures for messages other than M. More specifically, the security of RSA and DSA schemes is based on the hope that number-theoretic problems such as factoring and computing discrete logarithms are impossibly hard for almost all large numbers, the hope that the hash function used for pre-hashing is secure, and, most importantly, the hope that the adversary must be able to factor or solve the discrete log problems in order to be able to forge a signature. In fact, there is no proof that forging RSA signatures is as hard as factoring or that forging DSA signatures is as hard as computing discrete logs even if a secure hash function were used for prehashing.

For example, if the adversary is able to factor, then he can compute the private key from the public key, whereupon he can begin to forge signatures at will for the RSA scheme. If the adversary can compute discrete logarithms, then he can compute forged signatures for the DSA scheme directly, without knowledge of the secret key. Moreover, if the adversary can find two messages M and M' for which h(M)=h(M'), then he can forge a signature for M' by obtaining a legitimate signature for M (since the signatures for M and M' are the same). If the adversary can invert h, then he can forge signatures by an alternative method using a slightly more complex attack. Finally, and most importantly, it might be possible for an adversary to forge signatures using an altogether different as-yet-unknown attack. Hence, in addition to the hope that it is not possible to achieve a known attack, the security of schemes such as RSA depend on the hope that there are no easier alternative attacks. In summary, this means that the security of signature schemes such as RSA and DSA is based on assumptions which may not always be defensible.

BRIEF SUMMARY OF THE INVENTION

It is an object of the invention to provide a new digital signature scheme that requires substantially less time for signing and verifying than prior art schemes such as RSA.

It is another object of the invention to provide a signature scheme which uses a secure hash function to prevent any known or future attack from succeeding in forging signatures without solving a very hard computational problem such as factoring.

It is a further object of the invention to provide a digital signature scheme that can be implemented with very cheap and simple hardware or software.

It is a still further object of the invention to describe a secure communications system implementing the new signature scheme and in which all users of a group share the same public key. In particular, if this common public key includes a composite number, the users will not know the key's factorization. This obviates certification of individual public keys for the users in the group.

As a further object, the present invention shows how to implement the new digital signature scheme to produce relatively short "certificates" of public keys if desired.

These and other objects are provided in a digital signature scheme wherein the signature of a message M relative to a public key is computed by means of a secret key. The scheme begins by having the user select a number x independent of M. This step may occur off-line and before there is any knowledge of the particular message M to be signed. To sign the message, the routine computes a description of a function G which is dependent of the message M, and then applies the function G to x to produce a string z. The routine outputs z and a description of a second function F as the desired signature of the message M. Thus according to the invention a signature of the message is obtained by applying to an independent argument x a function dependent on M. This operation provides enhanced efficiency and security over the prior art and facilitates use of the scheme to allow multiple users of a secure communications system to share the same public key; alternatively, the scheme is useful for generating short certificates of public keys used in such systems.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

For a more complete understanding of the present invention and the advantages thereof, reference may be made to the following drawings:

FIG. 1 is a flowchart representation of the preferred technique for generating a digital signature according to the present invention; and FIG. 2 is a flowchart representation of the preferred technique for verifying the digital signature generated in accordance with FIG. 1.

DETAILED DESCRIPTION

Figure 1:
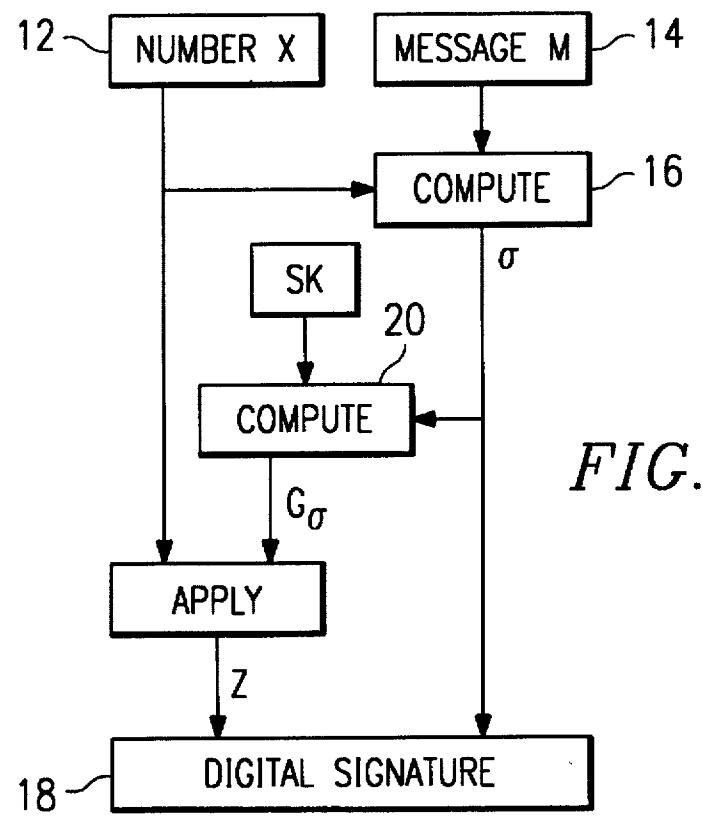

The following preliminary background is provided to facilitate the understanding of the new digital signature algorithm. Let n be the product of two large primes, $p_1 \equiv 3$ mod 8 and $p_2 \equiv 7$ mod 8. Define $F_0(x)=x^2$ mod n, $F_1(x)=4x^2$ mod n, and for any non-empty string of bits $\sigma=b_1b_2 \ldots b_k$, let $F_\sigma=F_{bk}(\ldots(F_{b2}(F_{b1}(x)))\ldots)$. Thus, each string σ is the description of a function, namely, $F_\sigma$, mapping numbers modulo n to numbers modulo n. Then, the following four properties hold for functions with such descriptions. First, $F_0$ and $F_1$ are permutations over the squares mod n, and so is $F_\sigma$ for any string σ. More specifically, because $F_0$ is a permutation, if x is a square mod n, then exactly one of its four square roots mod n is itself a square mod n; and this root will be denoted by ${}_x2^{-1}$. In general, if k is a positive integer, ${}_x2^{-k}$ will denote the unique square mod n, z, such that ${}_z2^k \equiv x$ mod n. Second, the integer 2 is not a square mod n, and thus ${}_42^{-1} \not\equiv 2$ mod n. Third, if one computes any two squares mod n, x and y, and any two different strings of equal length, σ and τ, such that $F_\sigma(x)=F_\tau(y)$, then one can easily factor n. Finally, let k be a positive integer, let $s={}_42^{-k}$ mod n, let σ be a k-bit string, let int(σ) be the natural number whose binary representation is σ without its leading O's (i.e., int(011)=3), and let X and z be squares mod n such that $X=F_\sigma(z)$. Then as the fourth property, $z={}_X2^{-k}/s^{int(\sigma)}$mod n.

With this background, the digital signature algorithm of the present invention can now be described. The inventive algorithm makes uses of a secure hash function H, which may be common to all users. For the following description of the algorithm, it is assumed that H produces 80-bit outputs and that the expression a|b denotes the concatenation of strings a and b (though other operators may be used to combine such strings).

The scheme begins with each user choosing a pair of public and secret keys. In particular, each user selects a large prime $p_1 \equiv 3$ mod 8 and a large prime $p_2 \equiv 7$ mod 8, and lets $n=p_1p_2$ be her public key and $s=1/{}_42^{-81}$ mod n be her secret key. For simplicity of notation, all the following computations are mod n unless otherwise specified. It should be appreciated that the value ${}_42^{-81}$ can be obtained easily by (1) computing $((p_i+1)/4)^{81}$ mod $p_i-1$, (2) computing $v_i=4^{u_1}$ mod $p_i-1$, and (3) applying the Chinese remainder theorem to $v_1$ and $v_2$ with moduli $P_1$ and $P_2$.

A user whose public and secret keys are n and s, respectively, signs a message M as follows. In a first "off-line" step, the user randomly selects a square x and computes $X={}_x2^{81}$. It is important that x, and thus X, be selected afresh for each message to be signed. In the second or "on-line" step, the signer computes σ=H(X|M), $t=s^{int(0\sigma)}$, and z=xt, and then outputs (z,σ) as the signature of M. It should be noted that σ (=H(X|M)) is a description of a function $G_\sigma$ (i.e., $G_\sigma(x)=xs^{int(0\sigma)}$ mod n) as well as the description of a second function $F_\sigma$ referred to above. Thus both the functions $G_\sigma$ and $F_\sigma$ depend on the message M because σ has been computed on input M. Then, z consists of applying $G_\sigma$ to x so as to produce a string z. It should further be noted that by the fourth property described above, $X=F_{0\sigma}(z)=F_\sigma(z^2)$. Thus, the signature (z,σ) of message M consists of a value z and the description of a function, namely $F_\sigma$, which depends on M. It should also be appreciated that the following relationship holds between $G_\sigma$ and $F_\sigma$: $F_{0\sigma}(G_\sigma(x))=X$. (Notice that the redundant 0 has been added to totally preserve the fourth property and may be dispensed with.)

For verification, given a message M and an alleged signature (z,σ) relative to the public key n, the scheme computes $X=F_\sigma(z^2)$, and then checks whether H(X|M)=σ. This check assumes that the concatenation operation was performed during signing; obviously other operations and/or additional inputs (such as the date, the name of the signer, the name of the recipient, or some other transaction identifier, etc.) may be used. If so, the signature is accepted. It should be noted that $z^2$ is a computationally- easy transformation of z. Also note that σ is the description of the function $F_\sigma$ and this function was chosen by the signer to be dependent on M because σ was computed via M. Further, it should be noted that from the result X of applying function $F_\sigma$ to input $z^2$, one can easily get back the description of $F_\sigma$, namely σ, by applying H on inputs X and M.

The above-described digital signature scheme is illustrated in FIG. 1, which is a flowchart of the basic steps used to implement the invention. The method begins with box 12 in which a number x independent of the message M is selected. Box 14 represents the message M. At box 16, the message and preferably the number x are used to compute a string σ dependent on the message M. String σ is then output as part of the digital signature as indicated by the arrow, which goes to the digital signature box 18. The other input to box 18 is a string z, which is formed in the following manner. String σ is provided as one input to box 20, which also receives the secret key SK. The string σ together with the secret key specify a permutation $G_\sigma$ composed from a given set of permutations. At box 22, the permutation $G_\sigma$ is applied to the number x to produce the string z. As noted above, the string z and the string σ are then released as the digital signature of the message M.

Figure 2:
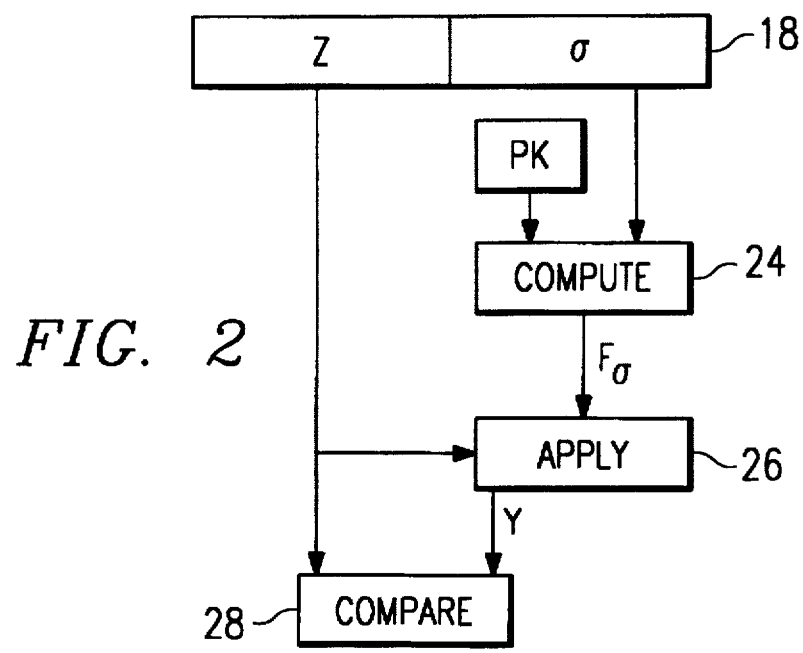

A method for verifying a digital signature of a message M relative to a public key is illustrated in FIG. 2. The method begins with the digital signature (box 18) of FIG. 1, which includes the string z and the string $\sigma$. The string $\sigma$ is applied box 24, which also receives the public key PK. The output of box 24 is a permutation $F_\sigma$ composed from a given set of permutations and specified by the string $\sigma$ and the public key. The method continues at box 26 by applying permutation $F_\sigma$ to string z to yield a string y. Box 28 then verifies whether string $\sigma$ is easily computable in polynomial time from at least string y and the message M.

The above-described algorithm is very efficient. To perform the off-line signing steps 82 multiplications are sufficient. To perform the on-line signing step, roughly 121 multiplications are sufficient if only the secret key s is remembered. Alternatively, if all the ${}_s2^i$ values are precomputed and then remembered, only about 41 multiplications are sufficient. This number may be further decreased if one is willing to precompute and store additional values. For verifying the signature of a message, about 81 multiplications are sufficient. Thus, the disclosed algorithm is much faster than RSA. In particular, the algorithm is at least 5 times faster if no extra ${}_s31\ 2^1$ value is stored, and at least 15 times faster if 81 such values are stored. Consequently the algorithm can be implemented with cheaper and simpler hardware than RSA.

Further, if H is a secure hash function, then the digital signature scheme of the present invention is very secure. For example, assume that an enemy chooses a number z and a 80-bit string $\sigma$ and computes $X=F_\sigma(z^2)$. Then he will be able to easily sign a message M only if H returns exactly the bit-pattern $\sigma$ on input X|M. But this will happen only with probability $2^{-80}$ since a secure H behaves randomly, and the adversary cannot easily increase this negligible probability. In fact, if he could concoct an X such that he could forge the signature of any message that, hashed with X, yields either of two different 80-bit patterns, $\sigma$ and $\tau$, then he should be able to produce two pairs $(z,\sigma)$ and $(\omega,\tau)$ for which $F_\sigma(z^2)=F_\tau(\Omega^2)=X$. But then, by the third property described above, the enemy could easily factor n.

Thus, if the hash function H is secure, forging signatures in the above algorithm is as hard as factoring n. Given the many and unpredictable ways by which an enemy can attack a signature scheme, knowing that no attack could bypass the difficulty of integer factorization if the hash function is secure is of fundamental importance. By comparison, no proof of equivalence to integer factorization exists for RSA. Indeed, one might be able to break RSA without being able to factor integers.

The disclosed scheme differs from RSA in further important respects. In the RSA scheme, the signature of a message M is computed by applying to ARGUMENT M a FIXED function. To the contrary, a signature of a message M according to the present invention is obtained by applying to an INDEPENDENT argument x a function DEPENDENT on M. Indeed, the disclosed scheme multiplies x by $s^{int(0\sigma)}$, where x is independent of M (because x is selected at random before M is even known), and $\sigma$ depends on M because $\sigma=H(X|M)$. The dramatic difference between RSA and the inventive scheme is also evident from their verification process. The RSA scheme verifies the signature of a message M by applying a fixed function to it and checking that the result is the original message M. In the present invention, the algorithm verifies the signature $(z,\sigma)$ of a message M by applying to a z a function that depends on M and checking that the description of the same function can be easily obtained from the result.

Those skilled in the art will recognize that many variants are possible for the digital signature scheme disclosed herein. For instance, one may omit the redundant 0, use a secure hash function mapping to a different number of bits, give the hash function additional inputs, or use composites of a different form. In addition, the number 4 can be replaced with another square S, preferably such that its square-root mod n is not known to an enemy. For instance, one may define $F_0(x)=x^2$ and $F_1(x)=Sx^2$ mod n. Also, rather than using one bit at a time, different patterns may be used. For instance, without intending to be restrictive, one may use 3-bit long strings and 8 squares $S_0, S_1, \ldots, S_7$ such that $F_{000}(x)=S_0x^2$, $F_{001}(x)=S_1x^2$, and so on. In fact, the routine can use totally different functions for $F_0$ and $F_1$, or for the $F_\sigma$'s.

The inventive algorithm (which for convenience will be referred to as the SM algorithm in the following discussion) can be used to provide additional properties and advantages, for example, enabling a group of users to share the same public key or to allow a group of users to sign without encrypting. In particular, assume that there is an agent A, who has selected an SM public key n keeping in storage its secret factorization. Then, A may use the SM algorithm to guarantee that (a) the users in the group can sign messages relative to n, so that each user is kept individually accountable for what he signs, and (b) the users in the group cannot encrypt messages. (Thus, revealing n's factorization to every user is not a solution. This way, in fact, the signatures produced by some user could have been produced by any other user and no one could be kept accountable for what he or she signs). In this situation, the following properties apply. Each user in the group, $A_i$, is guaranteed that another user $A_j$ cannot forge his signatures. Moreover, given $A_i$'s signature of a message M, anyone can verify that $A_i$ is the signer. The users further cannot use the keys that allow them to sign in order to encrypt messages to each other. Finally, A may act as a higher authority and can sign messages for the group. Alternatively, it can be arranged that no such higher authority exists e.g., without intending to be restrictive, it can be arranged that the factorization of n is not known to any individual user, but is only collectively known to a group of agents (e.g., a subgroup of users or possibly the whole group.)

The above properties are useful in a variety of settings. For instance, when A is a bank and the $A_i$'s its branches, or when A is the Government and the $A_i$'s government agencies or employees. In either case, A can safely delegate signing transactions without introducing any complications about encryption. The important point is that all users in the group share the same public key n without knowing its factorization. This fact thus provides the additional benefit that there is no need to certify individual public keys for the users in the group. In such case only a single composite number n needs to be certified outside the group, if it is not already universally known.

The SM algorithm may be used to achieve any of the above properties in a variety of ways. Without limiting such examples, one such technique uses the following theorem described by H. C. Williams, *A Modification of the RSA Public-Key Cryptosystem,* IEEE Trans. Inform. Theory, IT-26, 1980, at 726–729: let n be the products of two primes, one congruent to 3 mod 8 and the other to 7 mod 8. Then, for any member of $Z_n^*$, exactly one of x, −x, 2x, −2x mod n is a square mod n. Assume now that A has selected one such n, and has stored its secret prime factorization (which need not be done in the basic SM algorithm). Then, A allows his users to share essentially his same public key n as follows.

A computes $S_i$=H(n|i)(i.e., the hash of the concatenation of n and the name of the user himself). Then, A computes $\alpha_i \epsilon[1, -1, 2, -2]$ such that $\alpha_i S_i$ is a square mod n, computes the value $s_i=1/_{(\alpha_i S_i)}2^{-81}$ and gives $s_i$ to $A_i$ as a secret key. In essence, the corresponding public key of $A_i$ can be considered $(n,i,\alpha_i)$. Note that if n is universally known, the recipient of a signature of $A_i$ knows all of $A_i$'s public key, except for the two bits needed to specify $\alpha_i$. Also, it is not crucial that $S_i$=H(n|i), but it is important that $S_i$ be sufficiently random, though computable from i so that i's secret key is sufficiently unpredictable and unrelated to that of j).

To sign, $A_i$ signs a message M as in the basic SM scheme described above, but uses $s_i$ instead of $_4 2^{-81}$ and $S_i$ instead of 4. To the resulting signature (z,σ), $A_i$ also adds its own $\alpha_i$. To verify the signature $((z,\sigma),\alpha_i)$ of $A_i$ for message M, the verifier computes $S_i$=H(n|i) and $\alpha_i S_i$. Then, he computes $X=F_\sigma(z^2)$, but using $F_0(x)=x^2$ and $F_1(x)=\alpha_i S_i x^2$ as basic permutations, and accepts (z,σ) to be $A_i$'s signature of M if H(X|M)=σ.

This use of the SM algorithm not only differs from the schemes cited above, but also from those cryptosystems similar to other known systems where many users share both public and secret keys, or from other identity-based schemes.

The above way to use the SM algorithm to allow many users to essentially share the same public key also can be advantageously used to issue short certificates for the public keys of a digital signature system. By way of brief background, in any digital signature scheme, each user has a pair of matching verification and signing keys. The user's verification key must be as "public" as possible to allow as universal as possible verification of U's digital signatures. For these reasons, U's verification key is also referred to as U's public key, and the corresponding :signing key as U's secret key.

The question of how a user can make his own public key truly public is an important problem, and many possibilities exist. Moreover, techniques for building "certificates" of public keys are also known in the art. The traditional way envisions a hierarchy of authorities. For example, assume that there is a simple two-level hierarchy: a few thousand first-level authorities, $A'_1, A'_2, \ldots$, and a single second-level authority, A". It is assumed that each of the first-level authorities is capable of digitally signing, that their public keys, $PK'_1, PK'_2, \ldots$, are already known to A", and that the public-key of A", PK", is universally known. When a user U wishes to have his chosen public key, $PK_U$, certified, he goes to the authority, $A'_c$, closest to (or most convenient for) him. After verifying U's identity and the fact that he wishes to elect $PK_U$ as his own signing key (alternatively, $A'_c$ may receive a traditional notarized document to this effect), $A'_c$ provides U with a certificate consisting of (1) his own digital signature of $PK_U$ (relative to $PK'_c$) (2) his own public key $PK'_c$ and (3) the digital signature of A" of $PK'_c$ (relative to PK".) The second and third pieces of data are necessary since there may be a sufficiently-high number of first-level authorities and their public keys may not be universally known. Such a certificate is either given to user U, so that he will send it along with any digital signature of his (in order to enable anyone to verify it), or the certificate is posted in a sufficiently accessible database (so that anyone who wishes verify U's digital signature of a given message can retrieve the certificate of U's public key from the database).

In either case, a traditional certificate for $PK_U$ is quite long because it includes at least two pieces of data in addition to the signature of $PK_U$. This is undesirable, since public-key certificates must be sent along or retrieved with almost every single digital signature. Moreover, the recipient of a digital signature may wish to store its associated public-key certificate for a long time period to maintain proof of the signer's commitment. Such long certificates are thus very costly, because sending bits across communication lines (e.g., via a long-distance phone call) is expensive and because storing bits is expensive. Obviously the longer the certificate, the higher the cost associated with transmission and storage thereof.

The present invention provides a new and useful way of producing "short" certificates. Let n be the universally-known public key of A" within the SM digital signature scheme, and let A" store n's secret factorization. Then, as previously discussed in the context of allowing many users to share the same public key, A" may assign to each sub-authority a corresponding square with its corresponding secret signing key. For instance, A" may assign to $A_i'$ the square $\alpha_i S_i$ (where $S_i$=H(n|i) and $\alpha_i \epsilon[1, -1, 2, -2]$, for which no one knows a square root mod n, and the corresponding secret signing key $PK_i'=1/_{(\alpha_i S_i)}2^{-81}$, relative to the public key $(n,i,\alpha_i)$. Assume now that each user U goes to $A_i'$ to have certified his own public key $PK_U$. Then $A_i'$ gives to U his own signature of $PK_U$, plus a few additional bits, i.e., "i" and "$\alpha_i$". These additional bits, in principle, need not be more than about 22, if there are at most $10^6$ authorities of level 1. More realistically, if the first-level authorities were the post offices, for example, the "i" would look something like "MA02146", which is a zip code in a particular state, and $\alpha_i$ would consist of just 2 bits. (Indeed, the bits describing i may be unnecessary because the user going to the post office may know the name of it).

Since n is universally known, anyone can compute $S_i$=H(n|i) and $\alpha_i S_i$, and thus verify the signature of $A_i'$ of PKU relative to public key $(n,i,\alpha_i)$. Thus an SM certificate is some 500 bits shorter than a traditional DSA certificate or 1000 bits than an RSA certificate. Indeed, SM certification is so simple that it is worth using even if another signature scheme were adopted for the individual users.

While the present invention has been described generally, it should be appreciated that the algorithm is preferably implemented on a program storage device readable by a processor and tangibly embodying a program of instructions executable by the processor to perform the algorithm steps. A suitable processor for signing is a personal computer (e.g., a x86 processor running OS/2 or Windows, with suitable I/o devices) or a smart card, etc. A suitable verifier is a computing unit coupled to a card reader or capable of receiving messages from any convenient similar input (e.g., a telephone line or RF link).

It should be further appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. A digital signature scheme wherein the signature of a message M relative to a public key is computed by means of a secret key by:

(a) selecting a number x independent of M;

(b) computing a string σ dependent on M, wherein the string σ together with the secret key specify a permutation $G_\sigma$ composed from a given set of permutations, the secret key is a number that squared mod n at least once, yields a number computable from public information identifying the signer;

(c) applying the permutation $G_\sigma$ to the number x to produce a string z; and (d) releasing the string z and the string $\sigma$ as the digital signature of the message M.

2. The digital signature scheme as described in claim 1 wherein the string $\sigma$ is obtained from the number x and the message M by a computation that includes hashing.

3. The digital signature scheme as described in claim 1 wherein the yielded number is 4.

4. The digital signature scheme as described in claim 1 wherein a group of signers share the same public key, and wherein at least two of the signers have distinct secret keys.

5. The digital signature scheme as described in claim 4 wherein a given agent computes the secret key of at least one signer.

6. The digital signature scheme as described in claim 1 wherein the set of given permutations include one permutation mapping a square mode n to $S \cdot x^2$ mod n, where S is a given number.

7. The digital signature scheme as described in claim 1 wherein the public key includes a composite number n and one permutation in the set of permutations maps a square mod n to $Sx^2$ mod n, where S is a fixed number.

8. The digital signature scheme as described in claim 7, wherein a group of signers share the same public key and at least two of the signers have distinct secret keys.

9. The digital signature scheme as described in claim 8 wherein at least one agent computes the secret key of at least one signer.

10. The digital signature scheme as described in claim 8 wherein a set of agents choose the secret key of at least one signer, and wherein information in possession of a single agent does not enable the single agent to compute the secret keys.

* * * * *